United States Patent
Voigt (10) Patent No.: US 9,678,673 B2
(45) Date of Patent: Jun. 13, 2017

(54) COORDINATING REPLICATION OF DATA STORED IN A NON-VOLATILE MEMORY-BASED SYSTEM

(71) Applicant: HEWLETT PACKARD ENTERPRISE DEVELOPMENT LP, Houston, TX (US)

(72) Inventor: Douglas L. Voigt, Boise, ID (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 14/647,120

(22) PCT Filed: Mar. 28, 2013

(86) PCT No.: PCT/US2013/034245
§ 371 (c)(1),
(2) Date: May 25, 2015

(87) PCT Pub. No.: WO2014/158155
PCT Pub. Date: Oct. 2, 2014

(65) Prior Publication Data
US 2015/0317079 A1 Nov. 5, 2015

(51) Int. Cl.
*G06F 12/02* (2006.01)
*G06F 3/06* (2006.01)
(Continued)

(52) U.S. Cl.
CPC .............. *G06F 3/061* (2013.01); *G06F 3/065* (2013.01); *G06F 3/0688* (2013.01);
(Continued)

(58) Field of Classification Search
CPC .... G06F 13/14; G06F 9/30087; G06F 3/0688; G06F 3/065; G06F 3/061; G06F 12/0286;
(Continued)

(56) References Cited

U.S. PATENT DOCUMENTS 7,039,663 B1 * 5/2006 Federwisch ......... G06F 11/1451
711/165
7,293,192 B2 11/2007 Allen et al.
(Continued)

FOREIGN PATENT DOCUMENTS

CN 1779660 A 5/2006
CN 101174197 A 5/2008
(Continued)

OTHER PUBLICATIONS

Disaster Recovery and High Avaliability, (Web Page), downloaded May 21, 2015. http://publib.boulder.ibm.com/infocenter/cicsts/v3r1/index.jsp?topic=%2Fcom.ibm.cics.ts31.doc%2Fdfht2%2Fdfht2lo.htm.
(Continued)

*Primary Examiner* — Hiep Nguyen
(74) *Attorney, Agent, or Firm* — Trop, Pruner & Hu, P.C.

(57) ABSTRACT

A technique includes, in response to a first stream of writes to a first non-volatile memory system, generating a second stream of writes for a second non-volatile memory system; and coordinating replication of data stored in the first non-volatile memory system. The coordinating includes embedding at least one command in the second stream of writes to create a synchronization point for data storage in the second non-volatile memory system in response to at least one corresponding command in the first stream to create a synchronization point for data storage in the first non-volatile memory system.

15 Claims, 8 Drawing Sheets

(51) Int. Cl.
*G06F 13/14* (2006.01)
*G06F 9/30* (2006.01)
*G06F 11/20* (2006.01)
*G06F 11/14* (2006.01)

(52) U.S. Cl.
CPC ...... *G06F 9/30087* (2013.01); *G06F 11/2064* (2013.01); *G06F 11/2082* (2013.01); *G06F 12/0246* (2013.01); *G06F 13/14* (2013.01); *G06F 11/1441* (2013.01); *Y02B 60/1225* (2013.01)

(58) Field of Classification Search
CPC ............. G06F 11/0264; G06F 11/0246; G06F 11/2082; G06F 11/1441; Y02B 60/1225
See application file for complete search history.

(56) References Cited

U.S. PATENT DOCUMENTS

| | | | |
|---|---|---|---|
| 7,437,521 B1 * | 10/2008 | Scott | G06F 9/3001 711/151 |
| 7,627,729 B2 | 12/2009 | Bartfai et al. | |
| 7,809,892 B1 | 10/2010 | Chatterjee et al. | |
| 7,822,892 B2 | 10/2010 | Boyd et al. | |
| 2007/0011213 A1 | 1/2007 | Burton et al. | |
| 2007/0067584 A1 * | 3/2007 | Muto | G06F 11/2069 711/162 |
| 2007/0203958 A1 * | 8/2007 | Suzuki | G06F 11/2048 711/165 |
| 2008/0162728 A1 | 7/2008 | Robeal et al. | |
| 2010/0050014 A1 | 2/2010 | Bramante | |
| 2010/0325376 A1 | 12/2010 | Ash et al. | |
| 2011/0082836 A1 | 4/2011 | Wang et al. | |
| 2011/0167298 A1 | 7/2011 | Lee | |

FOREIGN PATENT DOCUMENTS

| | | |
|---|---|---|
| CN | 101755257 A | 6/2010 |
| CN | 101808137 A | 8/2010 |

OTHER PUBLICATIONS

ISR/WO, PCT/US2013/034245, Dec. 27, 2013, 10 pps.
Extended European Search Report received in EP Application No. 13879729.5, Sep. 14, 2016, 7 pages.
Wikipedia, "Disk Mirroring," Feb. 28, 2013, pp. 1-3, Available at: <https://en.wikipedia.org/w/index.php?title=Disk_mirroring&oldid=541304920>.
Wikipedia, "ECC Memory," Feb. 27, 2013, pp. 1-5, Available at: <https://en.wikipedia.org/w/index.php?title=ECC_memory&oldid=540954582>.

* cited by examiner

COORDINATING REPLICATION OF DATA STORED IN A NON-VOLATILE MEMORY-BASED SYSTEM

BACKGROUND

A computer system traditionally has contained both volatile and non-volatile storage devices. In this manner, due to their relatively faster access times, volatile memory devices, such as dynamic random access memory (DRAM) devices, typically have been used to form the working memory for the computer system. To preserve computer system data when the system is powered off, data has traditionally been stored in non-volatile mass storage devices associated with slower access times, such as magnetic media-based or optical media-based mass storage devices.

The development of relatively high density, solid state non-volatile memory technologies is closing the gap between the two technologies, and as such, non-volatile memory devices are becoming increasingly used for both traditional "memory" and "storage" functions.

DETAILED DESCRIPTION

Systems and techniques are disclosed herein, for purposes of coordinating the redundant storage of data in a computer system that includes primary and secondary non-volatile memory (NVM)-based storage. In this manner, the NVM-based computer system includes a primary NVM storage, which serves as the main (i.e., the "working") memory for the computer system; and a secondary NVM storage, which stores replicated data (i.e., data that is redundant to the data stored in the primary NVM storage). During its normal course of operation, the computer system generates a first stream of writes to the primary NVM storage to store data in the primary NVM storage, and this first stream of writes includes synchronization commands to create corresponding synchronization points. As described herein, the computer system is constructed to generate a second stream of writes to the secondary NVM storage and coordinate the first and second streams in a manner that allows recoverability from single points of failure, while minimizing memory access latency times.

Figure 1:
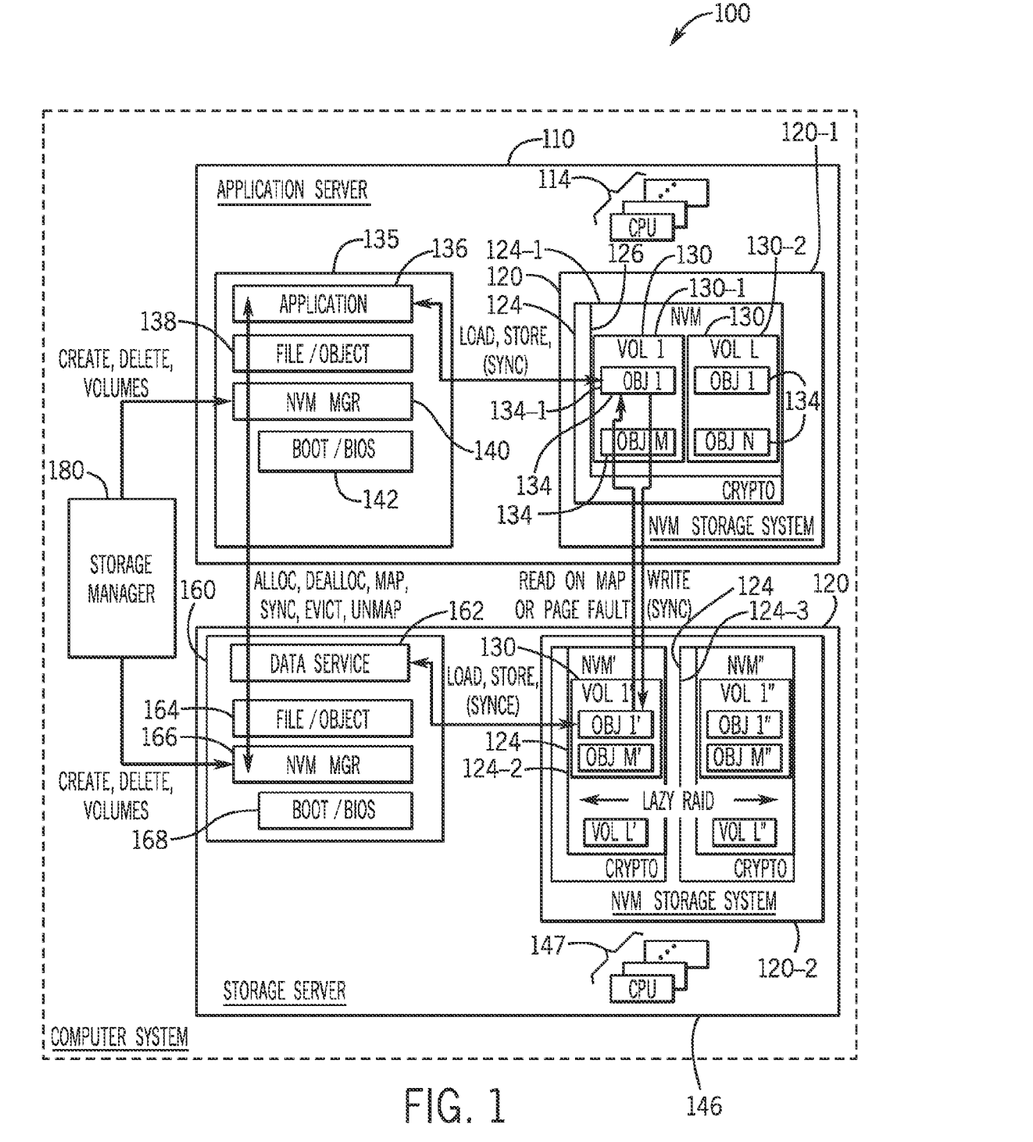
FIG. 1 is a schematic diagram of a computer system according to an example implementation.

As a more specific example, FIG. 1 depicts a computer system 100 according to an example implementation. The computer system 100 includes an application server 110, which is an actual physical machine that is made up of actual hardware and actual machine executable instructions, or "software." In this manner, the application server 110 includes one or multiple central processing units (CPUs) 114 (multiple CPUs 114, being depicted in FIG. 1, as an example), which may each contain one or multiple processing cores. The application server 110 also includes an NVM-based storage subsystem 120, which contains NVM storage 124-1 that serves as the main, or primary, working memory for the application server 110.

The CPUs 114 execute machine executable instructions to form one or more software-based components 135 for the application server 110, such as an example application 136, a file/object store 138 created and manipulated by the application 136, an NVM manager 140 and booting/basic input operating system (BIOS) firmware 142.

The application 136 manipulates various files and objects, which are stored in the primary NVM storage 124-1.

Because the CPUs 114 pipeline data and instructions, a failure or abrupt power loss may result in the loss of data that has been manipulated by the application 136 but not yet stored, or committed, to the primary NVM storage 124-1. Therefore, during its course of operation, the application 136 generates synchronization commands for purposes of assuring sufficient data consistency to guarantee recoverability in the event of failure or abrupt power loss.

In this regard, a given synchronization command causes the storage subsystem 120 to acknowledge that a certain number of writes that are identified by the synchronization command have been committed to the primary NVM storage 124-1. In this context, a "write" refers to the communication of data, the appropriate write command and the address to the storage subsystem 120 for the data to be stored in the primary NVM storage 124-1. The synchronization points created by the synchronization commands are used, in accordance with example implementations disclosed herein, for purposes of assuring that redundant copies of the data are stored in a secondary NVM storage, as further disclosed herein.

More specifically, as depicted in FIG. 1, in accordance with example implementations, the computer system 100 includes a storage server 146, which for this example contains an additional NVM-based storage subsystem 120-2 that contains two additional NVM storages 124-2 and 124-3. The NVM storage 124-1 of the application server 110 may be considered the "primary" NVM storage, the NVM storage 124-2 may be considered the "secondary" NVM storage, and the NVM storage 124-3 may be considered a third NVM storage, in accordance with an example implementation.

Like the application server 110, the storage server 146 is an actual physical machine that is made up of actual hardware and software. The hardware of the storage server 146 includes such components as one or multiple CPUs 147, and the NVM storages 124-2 and 124-3. The CPU(s) 147 may execute machine executable instructions to form software components 160, such as a data service component 162, file(s)/object(s) 164, an NVM manager 166 and boot up/BIOS firmware 168.

In accordance with example implementations that are disclosed herein, writes to a primary copy of the data stored in the primary NVM storage 124-1 may be streamed to the secondary NVM system 124-2 synchronously, or marked for replication. For a given synchronization command, the storage server 146 receives, or finishes receiving, all of the writes to be replicated along with the atomicity information related to the synchronization operation. Execution of the synchronization command completes after both copies are updated. Although both copies may be updated by the end of the synchronization command execution, the copies are not necessarily committed together. This means that, in accordance with some implementations, a power or hardware failure may force one copy or the other to be used in its entirety for recovery. Techniques are disclosed herein to allow recovery from a combination of the primary 124-1 and secondary 124-2 NVM storages, such as consistency group and logging techniques, as further disclosed herein.

Moreover, as further disclosed herein, the secondary NVM storage 124-2 may not be the only source for replicated data. In this regard, in accordance with some implementations, the storage server 146 creates additional redundancy in the background. In this regard, as disclosed herein, the storage server 146 may perform a background data service, such as redundant array of inexpensive disk (RAID)-based operations, to copy the data stored in the secondary NVM storage 124-2 to the NVM storage 124-3. This background process may be coordinated with unmap operations in such a way that the primary copy is not unmapped and evicted from the primary NVM storage 124-1 until the secondary copy is redundant.

In other words, techniques and systems are disclosed herein to create three copies of data (a primary copy and two redundant copies). The rate of secondary replication may be controlled using a recovery point objective to describe the maximum amount of work that may be lost in the event of a failure after an unmap command. Moreover, implementations are disclosed herein, which allow various data services, such as remote replication, point in time copying and data deduplication, to lag slightly behind the application's memory accesses while still operating on consistency points that are relevant to the applications.

Systems and techniques are disclosed herein in which data redundancy and other data services are managed for a storage system wherein multiple NVM storages are intercoupled. In this context, the "NVM storage" refers to memory that is, or can be, read or written on a per-byte or per-processor-cache line basis. In this context, when the NVM is directly written by processors using store instructions, for example, a synchronize operation may be used to assure sufficient data consistency to assure recoverability in the event of a failure or abrupt power loss. As disclosed herein, the synchronization points are further used to assure that a redundant copy of the data is also in place.

It is noted that although FIG. 1 depicts two servers, in further implementations, one or multiple additional application servers and/or one or multiple additional storage servers may be employed. In general, the servers may be blade servers in a common chassis. As an example, in accordance with some implementations, any component that is shared between the servers may be redundantly provided by the chassis or other components within it. In accordance with further implementations, the hardware and software components depicted in FIG. 1 may be disposed on a single physical server.

In general, the applications, such as application 136, execute in the application server 110, and the data services, such as example data service 162, execute in the storage server 146. Applications may consume storage related services within the application server 110, such as the file systems, object storage or databases, are collectively illustrated by reference numeral 138. These storage-related services may, in turn, use the NVM management services, provided by the NVM manager 140 of the application server 110, and/or drivers to control and coordinate access to the primary NVM storage 124-1, although reads and writes may take the form of load and store CPU instructions or other instructions with operands that call for memory access. In one example, the boot/BIOS components 142 are constructed to accommodate the NVM memory storage 124-1.

For the storage server 146, the data service component 162 may access file, object, database and NVM management services that are provided by an NVM manager 166. The vertical arrow of FIG. 1 traversing the application and storage server software components of both servers 110 and 146 indicates a flow of NVM-related commands, which originate at multiple levels of the stack. These support processes allocate and deallocate NVM, map and unmap CPU visible memory, evict pages from the CPU's physical memory and coordinate the states of the NVM memory storages 124-1, 124-2 and 124-3 in real time.

As depicted by the "crypto" designation in FIG. 1, the data stored in the NVM storages 124-1, 124-2 and 124-3 may be encrypted data, and as such, the computer system 100 may contain the appropriate encryption and decryption engines, which allows protection in the presence of removable non-volatile private data. The data stored with the NVM storages 124-1, 124-2 and 124-3, for the examples disclosed herein, are organized in volumes 130. For example, the NVM storage 124-1 of the application server 110 includes two example volumes 130-1 and 130-2. In one example, the NVM memory storage 124 may contain more or less than two volumes, depending on the particular implementation and application. Moreover, other data containment schemes may also apply, in accordance with further implementations. For the example of FIG. 1, the application server 110 contains L volumes 130 with various numbers of objects 134 contained therein. For the specific example of FIG. 1, the two volumes 130 contain M and N objects, respectively.

The NVM storages 124-2 and 124-3 of each storage server contains volumes and objects, which correspond to the volumes and objects of the NVM storage 124-1, in accordance with example implementations. In the following discussion, the notation "NVM" refers to non-volatile memory storage in the primary NVM storage 124-1, the notation "NVM'" refers to the NVM storage in the secondary NVM storage 124-2, and the notation "NVM''" refers to the NVM storage in the NVM storage 124-3. The objects are represented with corresponding notations. For example, "Vol 1" refers to volume one of the NVM storage 124-1, "Vol 1'" represents the corresponding volume one stored in the secondary NVM' storage, and "Vol 1''" refers to the corresponding volume stored in the NVM" storage. In one example, either the application server 110 or the storage server 146 may have actual NVM allocated for only a subset of the indicated objects at a given point in time.

In accordance with some implementations, the NVM' and NVM" storages may be in separate fault domains, meaning that the storages may share no single points of failure. Moreover, each of the NVM, NVM' and NVM" storages may have internal redundancy for purposes of recovering failed subsets of the NVM storage. These internal redundancy features may include error correction code (ECC) and erasure coding techniques, such as RAID, which provide additional protection against NVM media failure but may not tolerate all single points of failure within their respective servers.

The CPUs and NVM storage systems interact locally using load, store and other instructions, whose operands reference memory. In accordance with example implementations, the majority of NVM reads may be satisfied locally within the application server 110. However, the writes are, in general, continuously streamed from the application server 110 to the storage server 146. The synchronization operations, which coordinate NVM storage to assure accurate recovery from failure may flow either through the software stack or directly through the NVM hardware, depending on the particular implementation. In either case, synchronization operations cross the application/server boundaries. Some read operations on the application server 110 may access data that does not currently reside in the application server's NVM storage. In this case, the data may be retrieved, or read, from the NVM' storage on the storage server 146. These reads use access redirection in hardware and/or virtual address space management in software, similar to page fault handling techniques, as can be appreciated by the skilled artisan.

In addition to the application server 110 and the storage server 146, the computer system 100, in accordance with example implementations, includes a storage manager 180. In general, the storage manager 180 coordinates the configuration of the NVM aspects of the application 110 and storage 146 servers. These responsibilities include the creation and deletion of corresponding volumes or other containers on both the application 110 and storage 146 servers. In one example, depending on the particular application, the storage manager 180 may be disposed on a separate server (e.g., on a separate physical machine, for example), other than the machines containing the application 110 and storage servers 146; or may be part of the application 110 or storage 146 server. In general, the storage manager 180 may be part of the storage solution or the operating system (OS) managing the storage server 146. Moreover, the storage manager 180 may take the form of one or multiple plug-ins or widgets in the context of a broader management infrastructure, such as a self-service portal or a converged infrastructure suite.

The following timeline illustrates the operation of the computer system 100 in accordance with an example implementation. Thus, in accordance with other implementations, the computer system 110 may be operated in accordance with other timelines that support the coordination processes, as can be appreciated by the skilled artisan. First, the storage manager 180 creates an NVM volume, to which the application server 110 and the storage server 146 are made aware. The operating system of the application server 110 creates a file system that uses the volume or designates the space in the volume to be available to the application 136 via an NVMalloc operation, for example, which involves both the application and storage server software.

The application 136 creates and opens a file or object (example objects "OBJ1," "OBJ1M," and so forth being depicted in FIG. 1) or is given access to NVM space through an NVMalloc service. The application 136 or file/object software component 138 allocates NVM space for its use and maps it into the CPU's virtual memory space. The allocation and mapping information are communicated to the storage server 146, which creates corresponding "objects" (example objects "OBJ1'," "OBJM'," and so forth being depicted in FIG. 1) herein. In accordance with some implementations, the allocation and mapping may be combined as one operation. In further implementations, mapping may take place during the creation and opening of a file or object or concurrent with the NVMalloc service.

The application 136 accesses objects using CPU instructions with operands that reference the NVM storage. When memory locations are written, the CPU 114 initiates a corresponding communication with the storage server NVM manager 166. This communication may or may not include write data, depending on the particular implementation. The application server 136 may or may not wait for a response from the storage server 146 before viewing the write as complete.

For read requests, the read request is satisfied, if possible, from the application server's NVM space. If not in the NVM space, however, the data may be read from the NVM' space on the storage server 146.

During its course of operation, the application 136 may occasionally generate a synchronization command for purposes of expressing a recovery point. The synchronization command may be generated via an explicit call or it may be implicit in some use of the language in which the application 136 is written, depending on the particular implementation. The synchronization operation may traverse either a software path or a hardware path to the NVM storages 124-1 and 124-2. The synchronization implementations may include flush instructions, which are executed by the application CPU 114 and/or synchronization commands that are communicated to the NVM systems 124-1 and 124-2 via load or store instructions.

When an object in the NVM space no longer employs memory mapping, the application 136 or the operating system may issue an unmap command, which is communicated to both the application 110 and storage 146 servers. In this manner, when the unmap command completes, the application 136 no longer has direct access to the data. An unmapping may correspond with such events as the closing of a file, the halting of the application 136 or the operating system's need to free up memory address space for other purposes. It is noted that the data may be mapped again later.

When an object no longer needs to occupy the NVM storage, the application 136 or the operating system may evict the object from the NVM storage 124-1. If the object is still mapped and is subsequently read from or written to, the data is read from the NVM' storage into newly allocated physical space in the NVM storage 124-1, similar to paging systems. If the object is not mapped, then new space may be allocated in the NVM storage 124-1, and the mapping re-establishes the same data previously associated with the object and still stored on the storage server 146.

At some point, a volume may no longer need to be retained, and for this scenario, the storage server 146 may take actions to delete the volume from both the application server 110 and the storage server 146.

Other implementations are contemplated and are within the scope of the appended claims. For example, although the ensuing description takes the point of view of applications running on the application server 110, in other implementations, one or multiple applications may run, or be executed, on the storage server 146. For these implementations, the NVM' and NVM" storages may reside on different tiers of NVM or rotating media. As another example, although implementations are disclosed herein in which the data in the NVM' storage is duplicated onto the NVM" storage, other background processes may be performed, other than processes that maintain redundancy, in accordance with further implementations. For example, the same timelines and trigger points disclosed herein may be used to cause background processing for services, such as index creation, point in time copying or data deduplication.

Figure 2:
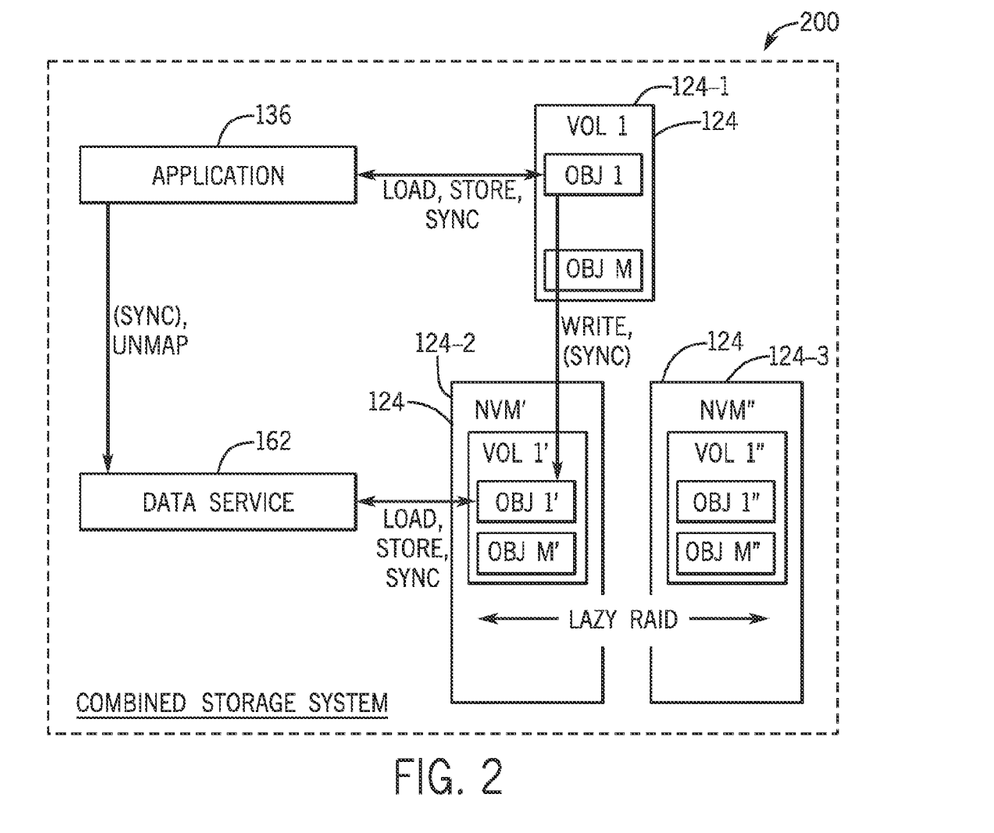
FIG. 2 is a schematic diagram of a combined primary and secondary non-volatile memory-based storage subsystem of the computer system of FIG. 1 according to an example implementation.
Figure 3:
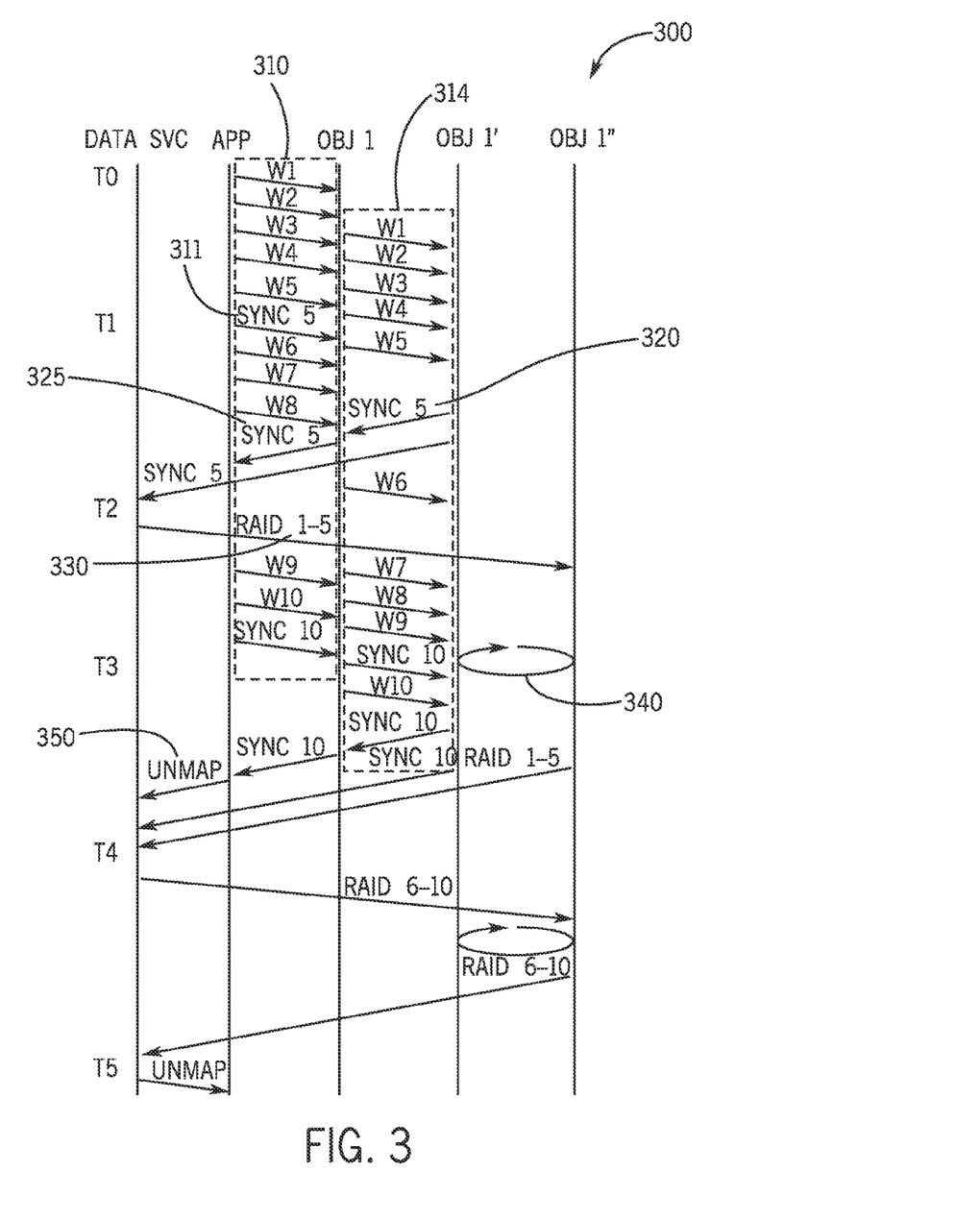
FIGS. 3, 7 and 8 illustrate operational flows of the storage subsystem of FIG. 2 according to different example implementations.

Referring to FIG. 2 (an illustration 200 of an exemplary combined storage system) and 3 (an exemplary workflow 300), operational flow begins at time $T_0$ with the application 136 executing a stream 310 of byte extent or cache line writes. For this example, the writes are associated with object Obj1. The NVM system 124-1 initiates write streaming 314 to the corresponding object Obj1' shortly after writing the Obj1 object.

At time $T_1$, the application 136 issues a synchronization command 311. The application 136 continues generating writes during the synchronization operation, although the application 136 is aware that the synchronization operation has not completed. In accordance with example implementations, the application 136 avoids corrupting the data being synchronized by waiting for the synchronization operation to complete if any concurrent writes conflict with each other.

The storage server 146 does not respond to the synchronization command 311 until the server 146 has received all of the writes up to and including any writes that are referenced by the synchronization command (writes W1 to W5 for this example). Although not depicted in FIG. 3, it is possible that a write that originated after the synchronization command may arrive before the synchronization operation completes. As with the application server's image, it is the application server's responsibility to avoid this scenario if it matters.

New time $T_2$, when all of the writes designated by the synchronized command have been committed to the NVM' storage, the storage server 146 responds to, or acknowledges 320, the synchronization command. In particular, the storage server 146 responds to the originator of the synchronization command (from the point of view of the server 146), which may be, for example, hardware associated with Obj1 object or the data service 162 for the case in which the synchronization command was delivered via software.

The final acknowledgment step is illustrated in FIG. 3 by the "Sync5" arrow 325 pointing from Obj1 object to "App." Regardless of the route of the response to the synchronization command initiator, the NVM storage 124-2 notifies the data service 162 that the synchronization command has been completed. This triggers a background process, which creates redundancy for the recently synchronized data within the storage server 146, as illustrated by "RAID 1-5" at reference numeral 330 in FIG. 3. The "1-5" designation indicates that the storage server 146 has a record of the writes that are to be made internally redundant and also has associated them with the synchronization command. A circular arrow 340 in FIG. 3 represents data transfers involved in the background replication to store the Obj1" object in the NVM" storage. This background replication includes not only the writes indicated by the synchronization command but all preceding writes as well. Subsequent writes to the same addresses in the Obj1 and Obj1' objects may cause temporary inconsistency in the RAID redundancy. This may be tolerated because the RAID redundancy may be ignored in accordance with example implementations until the corresponding objects are unmapped, at which point RAID consistency is assured.

The record of writes to be made redundant as a result of a given synchronization command may be retained in any number of ways, with each having a different metadata size and synchronization overhead characteristics. For example, in accordance with some implementations, a log of specific byte ranges written may be retained. In further implementations, a log of larger regions of storage containing the writes may be used. In accordance with further implementations, a bit map of fixed size regions may be maintained. In general, the larger the region size, the smaller the tracking structure and the more data that was not recently written is synchronized. In the case, the tracking structure is not a non-volatile storage, power failure may force resynchronization of all data just in case it was written.

In accordance with example implementations, a goal of the background replication process may be to create at least three effective copies of the data before the primary copy (such as "Obj1" object in the example in FIGS. 2-3) is evicted or unmapped from the application server memory. As a result, the time used to free space in the application server memory may be greatly reduced, as compared with scenarios where the entire object is replicated before eviction. This is illustrated near time $T_4$ in FIG. 3, when the application generates (reference numeral 350) an unmap command. In response to the unmap command, the data service 162 may expedite completion of the remaining synchronization activity related to the Obj1". Whether completion is expedited or not, once the Obj1" replica is stable, the data service 162 responds to the unmap command, and the Obj1 object may be safely removed from the application server 136, due to a fault tolerant copy being stored on the storage server 146. After this point, the Obj1" object may be used to recover the Obj1' object.

In accordance with example implementations, the RAID algorithm may span more than two devices, which here, are multiple NVMs. For these algorithms, the "lazy" RAID process spans additional NVMs as needed. When such algorithms are used, a single RAID stripe may not include more than one object that can be unmapped separately. Otherwise, parity information for other unmapped objects in the same stripe may become inconsistent due to ongoing activity in objects that are still mapped. One way to minimize this effect is to disable the lazy RAID on partially mapped stripes by expediting RAID so that the RAID completes during the synchronization operation. The exposure gap may be completely closed if a log is used, as further disclosed below.

Figure 4:
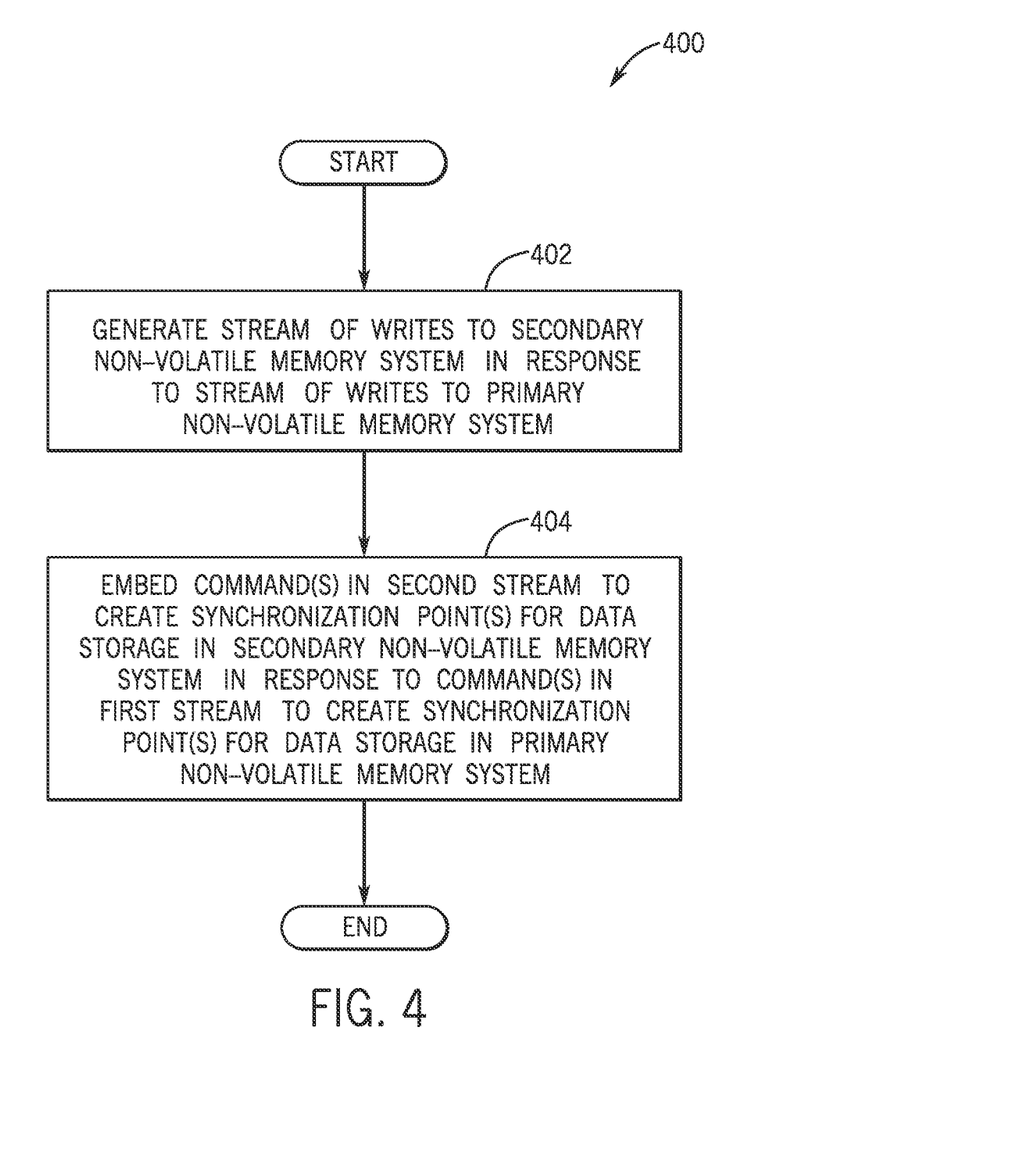
FIG. 4 is a flow diagram depicting a technique to coordinate redundant storage of data in the storage subsystem of FIG. 2 according to an example implementation.

Thus, referring to FIG. 4, in accordance with example implementations, a technique 400 includes generating (block 402) a stream of writes to a secondary non-volatile memory system in response to streams of writes to a primary non-volatile memory system. The technique 400 includes embedding (block 404) one or more commands in the second stream to create one or more synchronization points for data storage in the secondary non-volatile memory system in response to the command(s) in the first stream to create synchronization point(s) for data storage in the primary non-volatile memory system.

Figure 5:
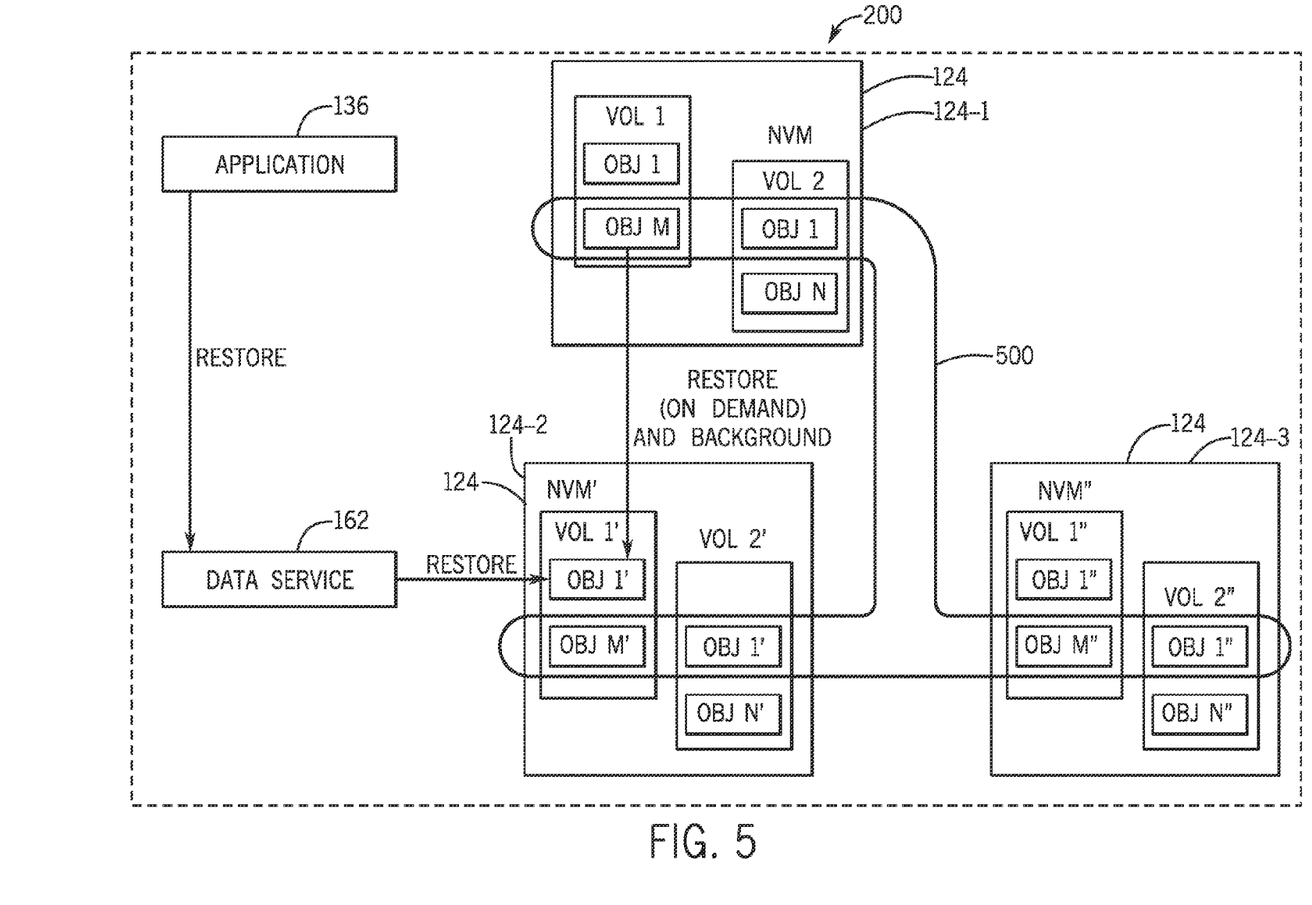
FIG. 5 is a schematic diagram of the storage subsystem of FIG. 2 illustrating restoration of a consistency group according to an example implementation.

FIG. 5 illustrates the combined storage subsystem 200 for purposes of restoring a consistency group. In this manner, in the event of application server failure, data from the storage server 146 is restored to the application server 110. In accordance with an example implementation, the storage server 146 may not have a record of the bytes written within the application server 135 between the completion of the last synchronization operation and the point in time of failure. Unless the application's recovery algorithm includes rolling back memory state to the most recently completed synchronization command, the entire NVM image that is relevant to the application 136 is restored. The grouping of all data relevant to the application 136 for this purpose is called a "consistency group," such as consistency group 500 of FIG. 5.

As illustrated in FIG. 5, the consistency group 500 may span multiple volumes and may include arbitrary objects, partially or in their entirety, within multiple volumes. The consistency group 500 may also include all of the corresponding replicas within the storage server 146. The composition of each consistency group 500 may be part of the non-volatile configuration state of the storage server 146. After failure, a replacement application server inherits the consistency group 500, establishes a mapping that corresponds to that used by the old server, recovers the consistency group 500 to a consistent state, and begins using the data in the consistency group 500. This process may be orchestrated by the storage manager of an OS failover component in conjunction with the storage manager, depending on the particular implementation. The storage manager may send a background restore command to the data service, for example.

During recovery, reads may be demand paged from the consistency group replicas in the storage server 146. At the same time, a background restoration process may be used to place the desired data, if known, back in the application server NVM so that the data may be present without demand paging when needed.

In general, restoring the entire consistency groups may not be a burden because it may only apply to server failures. Most NVM systems have their own self-contained redundancy, including error correction code (ECC) and/or RAID-style algorithms, which recover from NVM chip failures. In further implementations, a group that has a relatively finer granularity than a consistency group may be employed. In this manner, referring to FIG. 6, the combined storage subsystem 200 may include an NVM-based log 600. For the example disclosed herein, the log 600 receives writes at the same time as writes to the NVM storage 124-2. Because the log 600 is in NVM on the storage server 146, there is a replica of every write before completion of the initial write to the NVM storage 124-2. The use of the log 600 minimizes the chance that a short term lapse in the operation of NVM storage 124-2 or assures that congestion that is related to NVM storage 124-2 does not interfere with the application operation.

Figure 6:
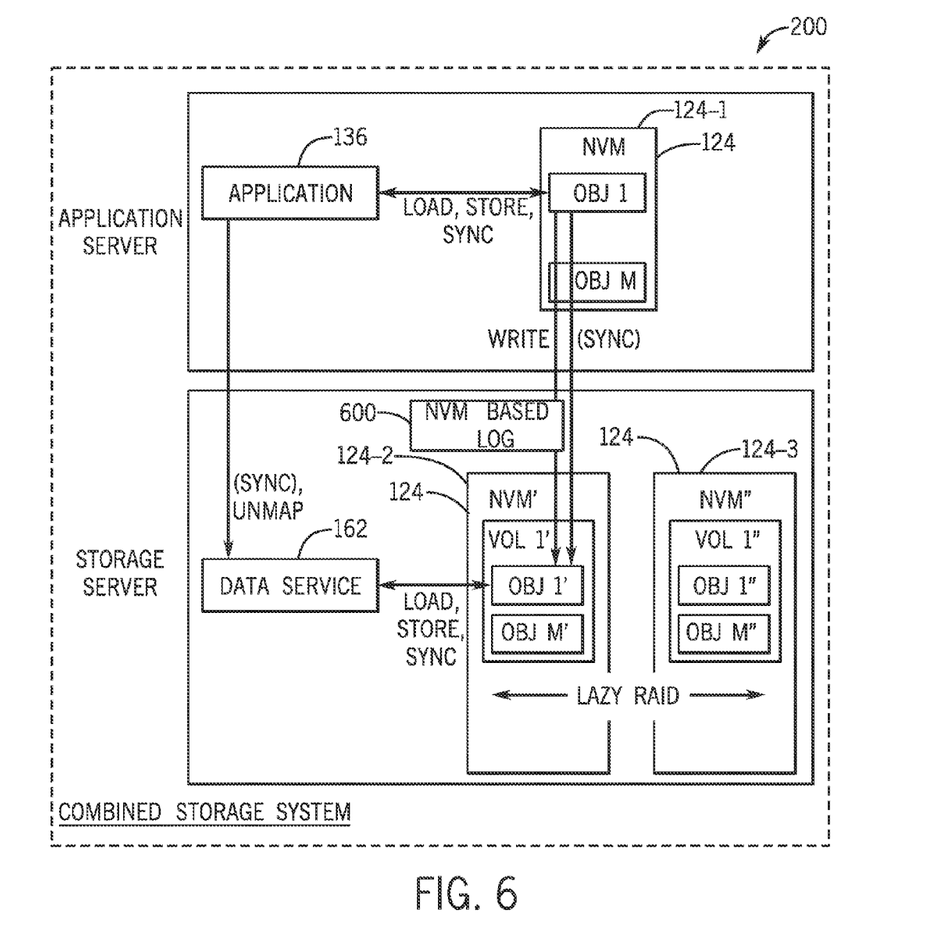
FIG. 6 is a schematic diagram of the storage subsystem of FIG. 2 illustrating the use of logging of writes to secondary non-volatile memory storage according to an example implementation.

For the example of FIG. 6, the log 600 is illustrated as being a separate component from the NVM' storage, as it is intended to be smaller, more reliable and generally lower power than the NVM' storage. This is to maximize the probability that the log will be accurate and up to date in any failure or power lost scenario other than those that affect the component or the entire storage server.

Figure 7:
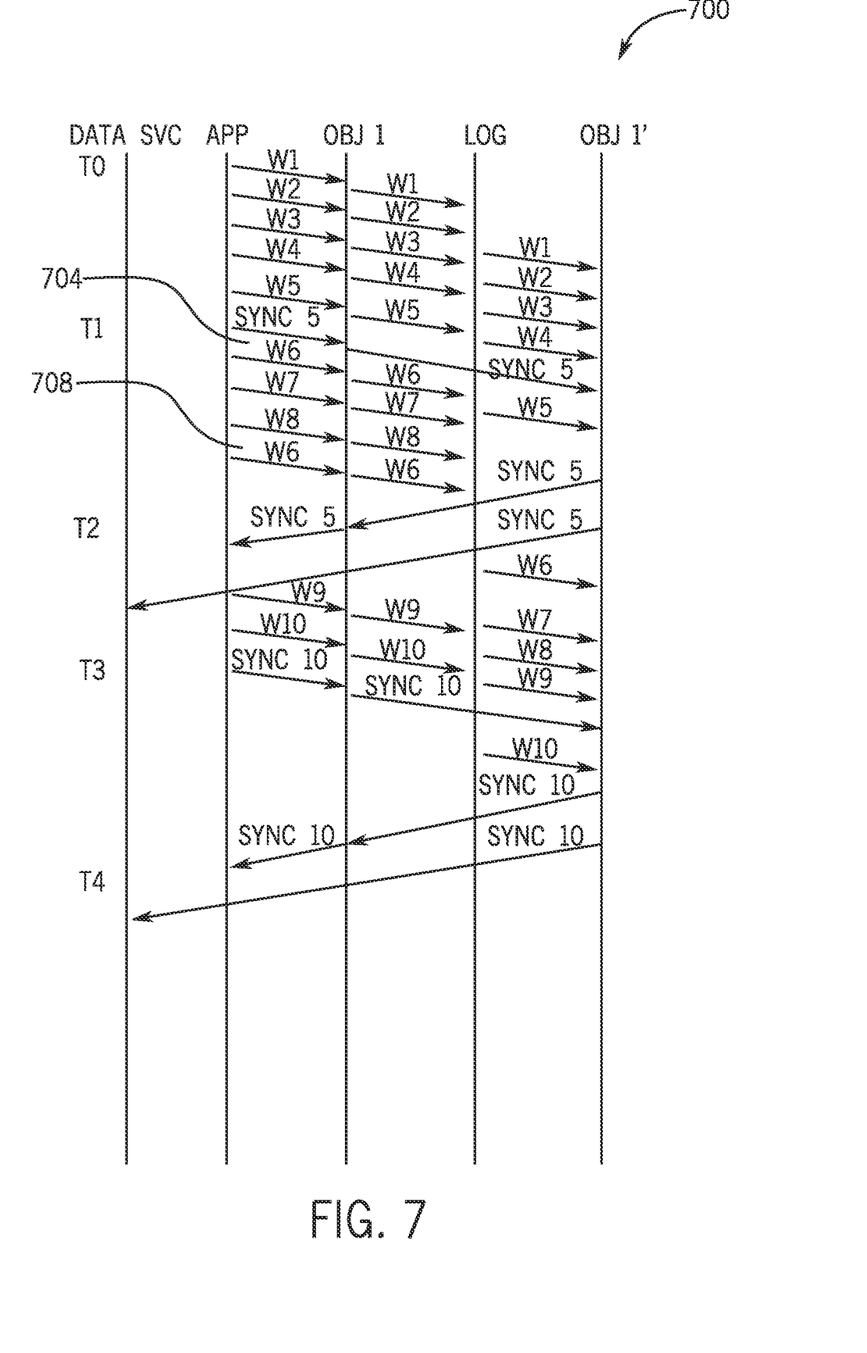

As a more specific example, in accordance with example implementations, the log 600 may be a first in first out (FIFO) buffer, that has parity protection so that the log 600 may operate at the line rate of the application server interface. In accordance with some implementations, the log 600 may also record the address and data of every write. The log 600 may collapse re-writes of a given address from the application server 135, as long as there was no intervening synchronization operation. This is illustrated in FIG. 7 of an example workflow 700. In this manner, write number six (W6) occurs twice (as illustrated at reference numerals 704 and 708) with different values but gets consolidated in the log 600.

The size of the log 600 may be calculated by setting the goals for the amount of temporary delay in the NVM' storage, which may be tolerated and the maximum transfer rate from the storage server 146. For example, maximum transfer rates for multiple lane photonic interconnects might be, as an example, 400 gigabits per second (Gbits/s). For a temporary cumulative lag of one microsecond (μs), there should be about 50 kilobytes (Kb) in the log 600. The average transfer rates in and out of the log 600 must relatively be matched in such a way that the 1 μs lag is not exceeded. The worst case lag is also affected by potential stalls in the outflow of data from the FIFO.

The log 600 may be used to track data that was accessed between synchronization operations after the operations complete. For example, a synchronization command may arrive every 10 μs and take about 100 μs on average to complete. This means that the storage server 146 processes ten synchronization operations at a time. Furthermore, the storage server 146 contains enough data to cover 111 μs of write data, which is a log size of 5.55 megabits (Mb). To operate in this mode, the log 600 retains the data associated with each synchronization command until that synchronization operation completes. The data may be used by the synchronization operation to ensure that everything related to the synchronization operation is accounted for under a maximum number of failure scenarios.

The log may provide a complete accounting of log data and may be combined with expedited RAID to accommodate partially mapped RAID stripes. This allows correction of the parity in such stripes after a power loss. For purposes of accommodating component failure during power failure, parity consistency management techniques may be employed. For example, two versions of parity may be retained in the NVM storage prior to the writing of new data. At the point when the new version of parity is completely generated, that completion becomes the commit point of the stripe update. From that point on, the new data in the log 600, which was not yet written to NVM' storage is assumed to be correct. If the new version of the parity was not completed, then the old version of parity and the old data are used. Coordinated data and parity commitment embedded in a formal transaction and timestamped versions of data and parity may also be used.

In accordance with example implementations, the log 600 may be used for purposes of tuning shadowing, i.e., tuning a timing to allow the shadowing of updates in the NVM storage by one or more synchronization operations in the NVM' storage. This allows atomicity of synchronization operations in NVM' storage with respect to visibility across servers when NVM' storage is shared. The shadowing is illustrated in connection with an example workflow 800 of FIG. 8.

Figure 8:
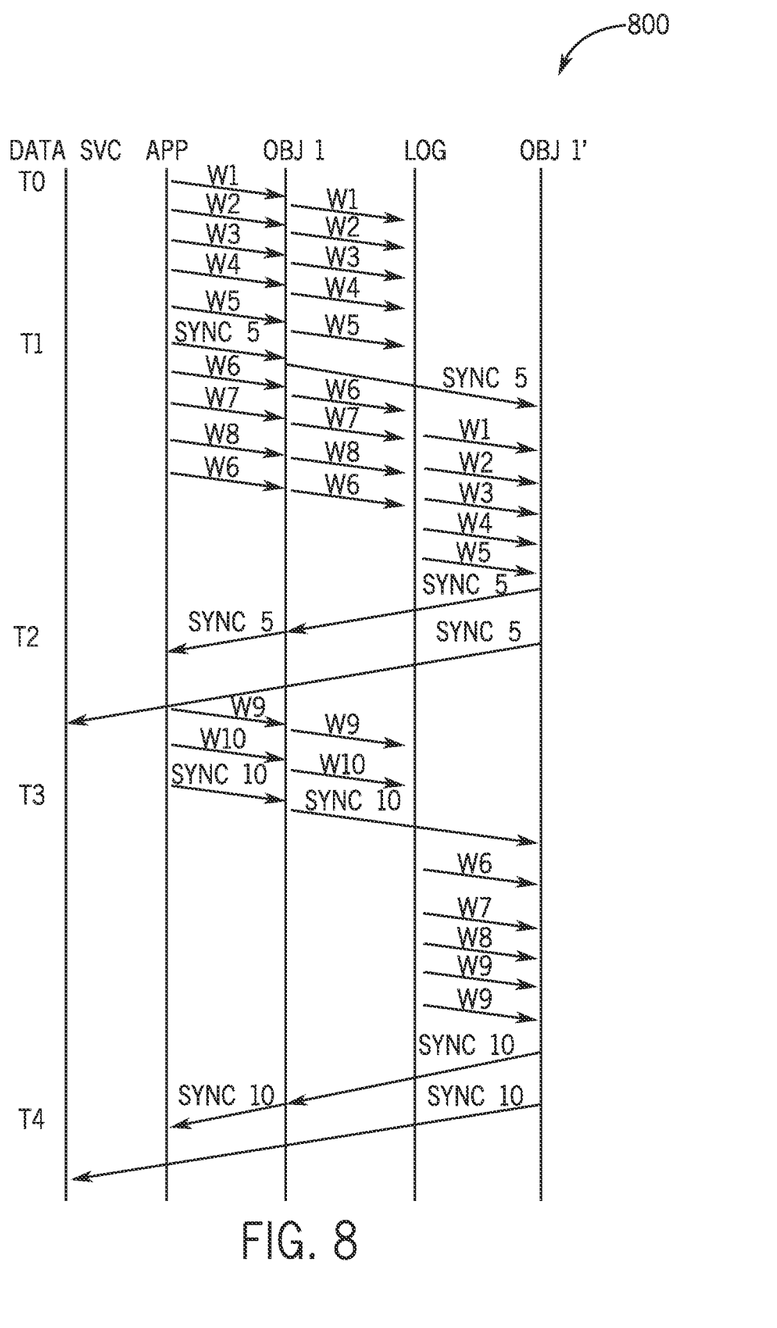

When this work flow is used, any writes in the log that were not associated with a subsequent synchronization operation are discarded during power failure or server failure recovery so that operation resumes from a consistent state.

While a limited number of examples have been disclosed herein, those skilled in the art, having the benefit of this disclosure, will appreciate numerous modifications and variations therefrom. It is intended that the appended claims cover all such modifications and variations.

What is claimed is:

1. A method comprising:
   in response to a first stream of writes to a first non-volatile memory system, generating a second stream of writes for a second non-volatile memory system; and
   coordinating replication of data stored in the first non-volatile memory system, comprising embedding at least one command in the second stream of writes to create a synchronization point for data storage in the second non-volatile memory system in response to at least one corresponding command in the first stream to create a synchronization point for data storage in the first non-volatile memory system.

2. The method of claim 1, further comprising:
   performing a data service on a third non-volatile memory system in response to the second stream of writes.

3. The method of claim 2, wherein performing the data service comprises at least one of performing indexing, deduplication, compression, remote replication, point in time copying and performing redundant array of inexpensive disks (RAID)-based writes to the third non-volatile memory system.

4. The method of claim 1, further comprising:
logging the second stream of writes in the second non-volatile memory system, the logging comprising storing data indicative of the second stream in a queue of the second non-volatile memory system; and
retrieving the data from the queue and performing the writes in the second non-volatile memory system.

5. The method of claim 4, wherein the logging comprises tuning a size of the queue to regulate shadowing of the writes of the first stream.

6. The method of claim 5, further comprising using content derived from the logging to complete partial results of data service computations interrupted by power loss.

7. A computer system comprising:
an application server comprising at least one processor and a first non-volatile memory,
wherein the application server is adapted to:
generate a first stream of writes to the first non-volatile memory, the first stream comprising at least one synchronization command to create a synchronization point for data storage;
coordinate replication of data stored in the first non-volatile memory, the coordination including, in response to the first stream of writes, generating a second stream of writes for a second non-volatile memory system; and
embed at least one synchronization command in the second stream of writes to create a synchronization point for data storage in the second non-volatile memory system in response to the at least one synchronization command of the first stream.

8. The computer system of claim 7, further comprising:
a storage server comprising a second non-volatile memory to store data in response to the second stream of writes and a third non-volatile memory, wherein the storage server is adapted to duplicate the data stored in the second non-volatile memory to create redundant data in the third non-volatile memory.

9. The computer system of claim 8, wherein the storage server is adapted to generate and store parity information with the data stored in the third non-volatile memory.

10. The computer system of claim 8, wherein the storage server is adapted to acknowledge at least one restore point associated with the at least one synchronization command of the first stream to the application server.

11. The computer system of claim 8, wherein the storage server comprises a plurality of physical machines.

12. The computer system of claim 8, wherein the storage server is adapted to use a background process to perform a data service on data stored in the second non-volatile memory and regulate a priority of the background process based at least in part on whether the application server has a mapping to corresponding data stored in the first non-volatile memory.

13. The computer system of claim 8, wherein the storage server further comprises:
a queue to store a log indicative of the second stream.

14. An article comprising a non-transitory computer readable storage medium to store instructions that when executed by a processor-based system cause the processor-based system to:
in response to a first stream of writes to a first non-volatile memory system, generate a second stream of writes for a second non-volatile memory system; and
coordinate replication of data stored in the first non-volatile memory system, the coordination comprising embedding at least one command in the second stream of writes to create a synchronization point for data storage in the second non-volatile memory system in response to a corresponding command in the first stream to create a synchronization point for data storage in the first non-volatile memory system.

15. The article of claim 14, wherein:
the first non-volatile memory system comprises non-volatile memory devices selected from phase change memory devices, memristor memory devices and magnetoresistive memory devices; and
the at least one synchronization command of the first stream of writes is used to confirm data in a processor pipeline has been committed to the first non-volatile memory system.

* * * * *